7762X
I. Michener,
Saw-Mill Head-Block.
Patented Sep. 16, 1833.
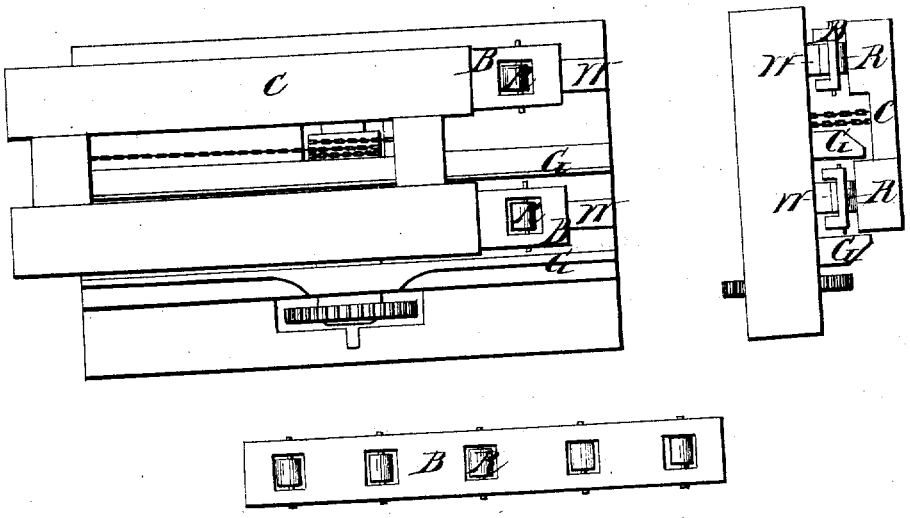
AM. PHOTO-LITHO. CO. N.Y. (OSBORNE'S PROCESS.)

7762X

Sept. 16. 1833

Joseph Michener of Chester Township Ohio

Letters Patent

The Schedule referred to in these Letters Patent and making part of
the same containing a description in the words of the said Joseph
Michener himself of his Improvement in a machine for Propelling
carriages for saw Mills.

To all whom these Presents shall come. Be it known that I
Joseph Michener of Chester Township and County of Clinton and
and State of Ohio. have invented a new and useful improvement
in a machine for Propelling Carriages for Saw Mills and that the
following is a full and exact description of the construction and op-
eration of the said Machine as invented or improved by me.
C is the Carriage. R the Rollers in which the carriage moves. W.
G. is the way and guides. A Rope may pass round the shaft of
the cog wheel twice, which cog wheel and shaft is represented in
frame between G and W. which will supply the place of cog wheels Witnesses
Jno. Brown
Jeptha Cowell Joseph Michener Esqd 176 words (Patented September 16. 1833)
(Dr in portfolio)